(12) United States Patent
Fong et al.

(10) Patent No.: US 10,643,596 B2
(45) Date of Patent: May 5, 2020

(54) APPARATUS PROVIDING UNCORRELATED NOISE MASKING

(71) Applicant: PPIP LLC, Tempe, AZ (US)

(72) Inventors: Michael Fong, Chandler, AZ (US); Neric Hsin-wu Fong, Tempe, AZ (US); Teddy David Thomas, Bedford, NH (US)

(73) Assignee: PPIP, LLC, Tempe, AZ (US)

( * ) Notice: Subject to any disclaimer, the term of this patent is extended or adjusted under 35 U.S.C. 154(b) by 0 days.

(21) Appl. No.: 16/272,924

(22) Filed: Feb. 11, 2019

(65) Prior Publication Data

US 2020/0043458 A1 Feb. 6, 2020

Related U.S. Application Data

(60) Provisional application No. 62/630,126, filed on Feb. 13, 2018.

(51) Int. Cl.
*H04R 3/02* (2006.01)
*G10K 11/175* (2006.01)
*H04L 9/08* (2006.01)
*G06F 7/58* (2006.01)
*H04R 29/00* (2006.01)

(52) U.S. Cl.
CPC ............ *G10K 11/175* (2013.01); *G06F 7/58* (2013.01); *H04L 9/0869* (2013.01)

(58) Field of Classification Search
CPC ........ G10K 11/175; H04L 9/0869; G06F 7/58
USPC .................................... 381/73.1, 58
See application file for complete search history.

(56) References Cited

U.S. PATENT DOCUMENTS

2016/0234356 A1* 8/2016 Thomas ............... H05K 9/0069

* cited by examiner

*Primary Examiner* — Ammar T Hamid
(74) *Attorney, Agent, or Firm* — Fernando & Partners, LLP

(57) ABSTRACT

In accordance with some embodiments, an apparatus for privacy protection is provided. The apparatus includes a random number generator providing a random number sequence. The apparatus also includes a key generator operable to receive the random number sequence and synthesize the random number sequence to generate a plurality of keys. The apparatus also includes a plurality of randomizing chains, each receiving a corresponding key from the key generator and providing a respective discrete random number sequence based on the corresponding key. The apparatus further includes output devices, each of which is connected to a respective randomizing chain to receive the respective discrete random number sequence and produces a respective output noise signal based on a function of the respective discrete random number sequence. The apparatus also includes interfaces mating the output devices with the input devices of a second device.

20 Claims, 6 Drawing Sheets

APPARATUS PROVIDING UNCORRELATED NOISE MASKING

PRIORITY CLAIM

This application claims priority to U.S. provisional patent application No. 62/630,126 filed on Feb. 13, 2018, the contents of which are hereby incorporated by reference.

TECHNICAL FIELD

This relates generally to the field of privacy protection, and more specifically to an apparatus for providing uncorrelated noise masking signals.

BACKGROUND

Smartphones have sensors to collect information from users. For example, a third-party can exploit microphones on smartphones to eavesdrop on a conversation. Further, smartphones also have radios for local or remote communications, e.g., a cellular radio, a WiFi radio, and/or a Bluetooth radio, etc. Once the sensors collect the information, the radios can transmit the information to the third-party, thus allowing the third-party to eavesdrop from a remote location. Currently, smartphones are not capable of masking information collected by the sensors, and unprotected user private information can be collected and disseminated. As such, smartphones are inadequate in providing user privacy protection.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
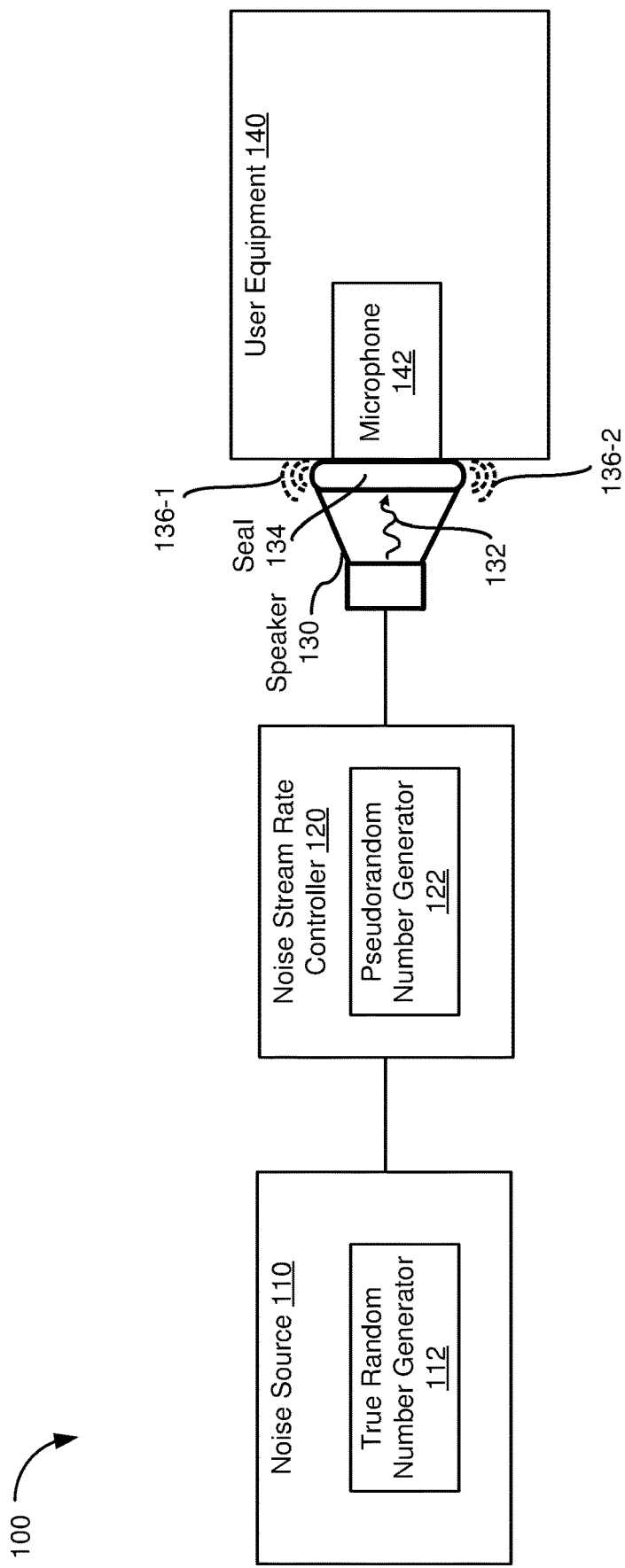
FIG. 1 is a block diagram of an exemplary noise masking system in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus (also known as a smart case, a safe case, an active case, an active base, or an audio jamming device) for providing uncorrelated noise masking signals. The uncorrected noise masking signals are fed to input devices on user equipment, e.g., to microphones on a personal communication device. In accordance with some embodiments, the apparatus synthesizes one random number sequence to produce uncorrelated keys. The apparatus then used the uncorrelated keys as random seeds to generate uncorrelated discrete random number sequences. The uncorrelated discrete random number sequences form separate noise streams in separate randomizing chains. Each of the randomizing chain is connected to an output device (e.g., a speaker), so that separate noise streams are fed to separate output devices (e.g., speakers). In some embodiments, each of the speakers is mateable (e.g., by an audio seal) with an input device (e.g., a microphone) on the user equipment. Thus, uncorrelated noise masking signals are passed to the input devices on the user equipment and mixed with ambient sound recorded by the input devices in accordance with some embodiments.

By providing noise masking signals, the apparatus described herein weakens a third-party's ability to eavesdrop through the input devices on the user equipment. In particular, the uncorrelated noise masking signals provided by the apparatus described herein make it more difficult to derive the protected audio content through elaborated efforts, e.g., by comparing and/or corroborating the audio signals from different microphones on the user equipment. Thus, relative to conventional privacy protection devices, methods, and systems, the apparatus disclosed herein is more effective in user privacy protection.

In accordance with some embodiments, an apparatus includes a random number generator that provides a random number sequence; a key generator coupled to the random number generator to receive the random number sequence and synthesize the random number sequence to generate a plurality of keys; and a plurality of randomizing chains coupled to the key generator, each receiving a corresponding key from the key generator, and each providing a respective discrete random number sequence based on the corresponding key; two or more output devices, each of the two or more output devices is connected to a respective randomizing chain to receive the respective discrete random number sequence and produces a respective output noise signal based on a function of the respective discrete random number sequence, wherein each of the two or more output devices is mateable to one or more input devices of a second device; and two or more interfaces mating the two or more output devices with the two or more input devices of the second device.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when", "upon", "in response to determining", or "in response to detecting", depending on the context. Similarly, the phrase "if it is determined" or "if [a stated condition or event] is detected" is, optionally, construed to mean "upon determining", "in response to determining", "upon detecting [the stated condition or event]," or "in response to detecting [the stated condition or event]," depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram of a noise masking system 100 is depicted, in accordance with some embodiments. In some embodiments, the noise masking system 100 includes a noise source 110, a noise stream rate controller 120, and at least one output device 130 (e.g., a speaker) for directing noise masking signals 132 to a user equipment 140. In the noise masking system 100, the output device 130 is mateable to an interface 134 (e.g., an audio seal). The interface 134 in accordance with some embodiments provides a path to direct and/or pass the noise masking signals 132 to a microphone 142 of the user equipment 140. The passing of the noise masking signals 132 to the microphone 142 masks the audio content recorded by the microphone 142. It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. Also, those of ordinary skill in the art will appreciate from the present disclosure that the functions of the components described below can be combined into one or more components and/or further sub-divided into additional sub-components; and, that the components described below are provided as exemplary configuration of the various aspects and functions described herein.

To that end, as a non-limiting example, in some embodiments, the noise source 110 generates a random (or pseudorandom) number sequence and provides the generated random number sequence to the noise stream rate controller 120. In some embodiments, the noise source 110 comprises an electrical component (e.g., a diode or a resistor) that generates electronic noise. In some embodiments, the electronic noise generated by the noise source 110 is the thermal noise generated by the thermal agitation of the charge carries inside an electrical conductor at equilibrium. As such, in some embodiments, the noise source 110 includes a true random number generator (TRNG) 112 that generates the random number sequence.

In some embodiments, the noise stream rate controller 120 uses the random number sequence as a source and further generates one or more discrete random number sequences. In some embodiments, the noise stream rate controller 120 includes one or more pseudorandom number generators (PRNG) 122, which control the rate of the random number sequence generation without sacrificing the randomness of the numbers. Connected to the noise stream rate controller 120, the speaker 130 then receives the one or more discrete random number sequences and outputs noise masking signals 132 as a function of the one or more discrete random number sequences. The noise masking signals 132 protect the input device (e.g., the microphone 142) on the user equipment 140 by jamming the audio content recorded by the microphone 142, including the user's conversation and/or the ambient sound captured by the microphone 142.

In some embodiments, an interface, e.g., the interface 134 (also known as an audio seal or a seal) mates the speaker 130 with the microphone 142. In some embodiments, the interface 134 is made of foam material (e.g., polymer foam) or other flexible materials (e.g., elastomer). In some embodiments, a sealed path is formed by the interface 134, e.g., a cavity and/or a tunnel and/or a sound tube. In some embodiments, the sealed path attenuates outside sound from reaching the microphone 142, thus providing some level of privacy protection. The sealed path also attenuates the amount of masking signals reaching outside of the path, e.g., the leaked noise masking signal 136-1 from the upper edge of the seal 134 and the leaked noise masking signal 136-2 from the lower edge of the seal 134, thereby reducing the obtrusiveness of such signals to the outside environment.

Though FIG. 1 illustrates the noise stream rate controller 120 controlling the noise masking signals feeding to one microphone 142, as will be shown in FIGS. 2-5 and described in detail below, the noise stream rate controller 120 can provide separate and uncorrelated randomizing chains to one or more microphones in accordance with some embodiments. In such embodiments, separate uncorrelated noise masking signals are fed to each microphone on the user equipment 140, thus reducing the likelihood of comparing signals from one microphone against another to extract the protected audio content. Further, in some embodiments as will be described in detail below, the noise stream rate controller 120 not only controls the rate of the random number sequence generation (e.g., with the PRNG 122), the noise stream rate controller 120 also provides noise shaping function in order to obtain desired output noise frequency characteristics. Sub-components of the noise stream rate controller 120 and the functions performed by the sub-components are described in detail below with reference to FIGS. 2-5.

Figure 2:
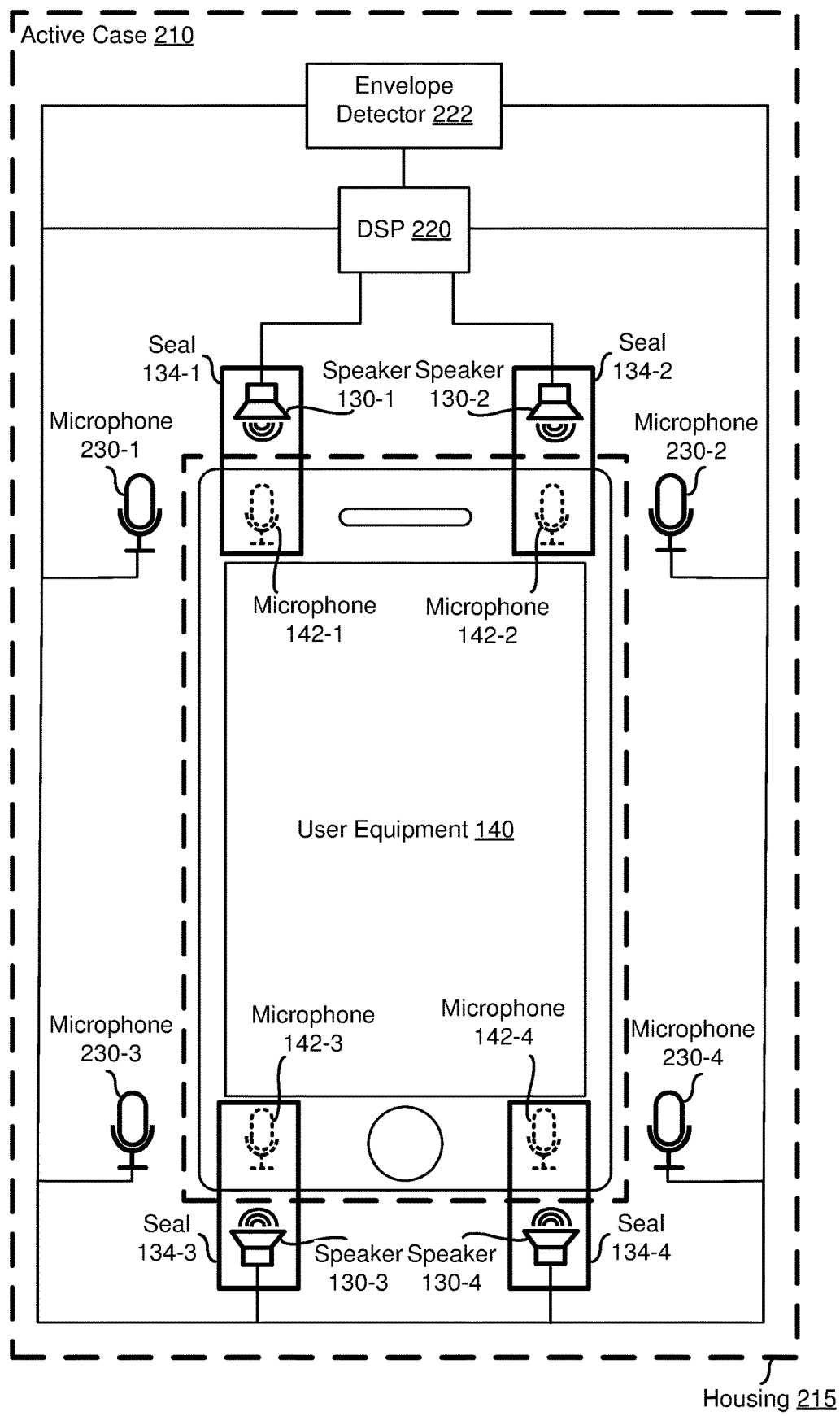
FIG. 2 is a block diagram of an exemplary audio jamming apparatus in accordance with some embodiments.

Turning to FIG. 2, FIG. 2 is a simplified block diagram of an audio jamming apparatus 210 (also known as a smart case, a safe case, an active case, an active base, or an audio jamming device) that provides noise masking signals, in accordance with some embodiments. In some embodiments, the active case 210 includes a housing 215 that receives and holds a second device, e.g., the user equipment 140. In some embodiments, the user equipment 140 includes one or more input devices, e.g., the microphones 142-1, 142-2, 142-3, and 142-4. It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. For example, though FIG. 2 shows the active case 210 protecting four microphones 142-1, 142-2, 142-3, and 142-4 on the user equipment 140, a plurality of microphones of the user equipment 140 can be protected by the active case 210 described herein. Also, those of ordinary skill in the art will appreciate from the present disclosure that the functions of the components described below can be combined into one or more components and/or further sub-divided into additional sub-components; and, that the components described below are provided as exemplary configuration of the various aspects and functions described herein.

To that end, as a non-limiting example, in some embodiments, the housing 215 is a housing assembly. In some embodiments, the housing assembly further includes sub-assemblies, e.g., a plurality of both moveable parts and non-moveable parts that can form an enclosure when assembled together. The housing 215 thus allows a user to insert the user equipment 140 into the active case 210 for more protection of sensitive information (e.g., in a work mode) or take the user equipment 140 out of the active case 210 for less monitoring of the personal communication by enterprise (e.g., in a personal mode).

For example, the sub-assemblies can include a base and a hood assembly that is moveable. In some embodiments, when the hood assembly is in a first position (e.g., hood down/lowered or clamped), the active case 210 is in a first mode of operation (e.g., a privacy protection mode or a work mode). On the other hand, when the hood assembly is in a second position (e.g., hood up or unclamped), the active case 210 is in a second mode of operation (e.g., an unprotected mode or a personal mode). In some embodiments, when the active case 210 in the first mode of operation (e.g., the work mode), the hood assembly coordinated with the base engages the audio seals 134 to mate the speakers 130 with the microphones 142. The audio seals 134 provide sealing paths between the speakers 130 and the microphones 142. Also in the first mode of operation (e.g., the work mode), in some embodiments, the active case 210 generates the noise masking signals. The noise masking signals are outputted from the speakers 130, directed at the microphones 142, and passed through the sealing paths.

In some embodiments, one end of each sealing path is a respective speaker 130 on the active case 210. In some embodiments, as explained above with reference to FIG. 1, each of the audio seals 134 that forms part of the sealing path is made of flexible materials, such that it extends from the surrounding edge of the respective speaker membrane. In some embodiments, the other end of each sealing paths covers a respective microphone 142 (or the opening of the respective microphone 142) on the user equipment 140. In some embodiments, the end of the sealing path covering (e.g., the speaker 130 along with the audio seal 134, FIG. 1) is cone shaped to better direct the noise masking signals and to allow better audio sealing of an opening of a microphone 142 on the user equipment 140. As such, through the audio seals 134, the speakers 130 of the active case 210 are mated with the microphones 142 of the user equipment 140, e.g., the audio seal 134-1 mates the speaker 130-1 with the microphone 142-1, the audio seal 134-2 mates the speaker 130-2 with the microphone 142-2, the audio seal 134-3 mates the speaker 130-3 with the microphone 142-3, and the audio seal 134-4 mates the speaker 130-4 with the microphone 142-4.

The sealing paths from the speakers 130 attenuate outside sound from reaching the microphones 142. The attenuation provides some privacy protection, e.g., by reducing the ambient sound captured by the microphones 142. More importantly, the sealing paths define passageways from the output devices (e.g., the speakers 130 of the active case 210) to the input devices (e.g., the microphones 142 on the user equipment 140), so that the output noise signal is fed through the passageways to the input devices. In other words, the sealing paths from the speakers 130 to the microphones 142 increase the amount of acoustical energy reaching the microphones 142 for better protection of the user equipment (i.e., the protected device) 140. Further, as described above with reference to FIG. 1, the sealed paths reduce the amount of noise masking signals from leaking outside the sealing paths (e.g., reducing the amount of leaked noise masking signals 136, FIG. 1), thereby reducing the detectability and/or obtrusiveness of the noise masking signals to the outside environment.

In some embodiments, the active case 210 includes a digital signal processor 220 supported by the housing 215 and coupled to the speakers 130. Embodiments of the digital signal processor 220 include hardware, software, firmware, or a combination thereof. In some embodiments, the digital signal processor 220 executes instructions stored in non-transitory memory to perform at least certain functions of noise source generation (e.g., the instructions for the noise source 110) and/or noise shaping (e.g., the instructions for the noise stream rate controller 120, FIG. 1). The noise shaping is further described below with reference to FIG. 3.

In some embodiments, the active case 210 also includes a plurality of input devices, e.g., microphones 230-1, 230-2, 230-3, and 230-4. The microphones 230 are at least partially supported by the housing 215. In some embodiments, the microphones 230 record sound independent of the sound recorded by the microphones 142 on the user equipment 140. In some embodiments, the active case 210 transmits the independently recorded sound to an external electronic device through a secure channel for secure communication. In some embodiments, as will be described below, the sound recorded by the microphone(s) 230 is used by an envelope detector 222 included in the active case 210 to facilitate noise shaping.

In some embodiments, the envelope detector 222 is coupled to the microphones 230 and the digital signal processor 220. In some embodiments, the envelope detector 222 includes an electronic circuit that takes audio signals (e.g., the ambient sound recorded by one or more of the microphones 230) as an input and provides an output as an envelope associated with the input. The envelope detector 222 thus detects the amplitude variations of the incoming audible signals. In some embodiments, the envelope detector 222 outputs the envelope information to the digital signal processor 220. Based on the envelope information, the digital signal processor 220 directs the speakers 130 to adjust the volume of the output noise signals from the speakers 130 appropriate for the level of ambient sound. The adaptive noise masking signal adjustment is further described below with reference to FIG. 3.

Figure 3:
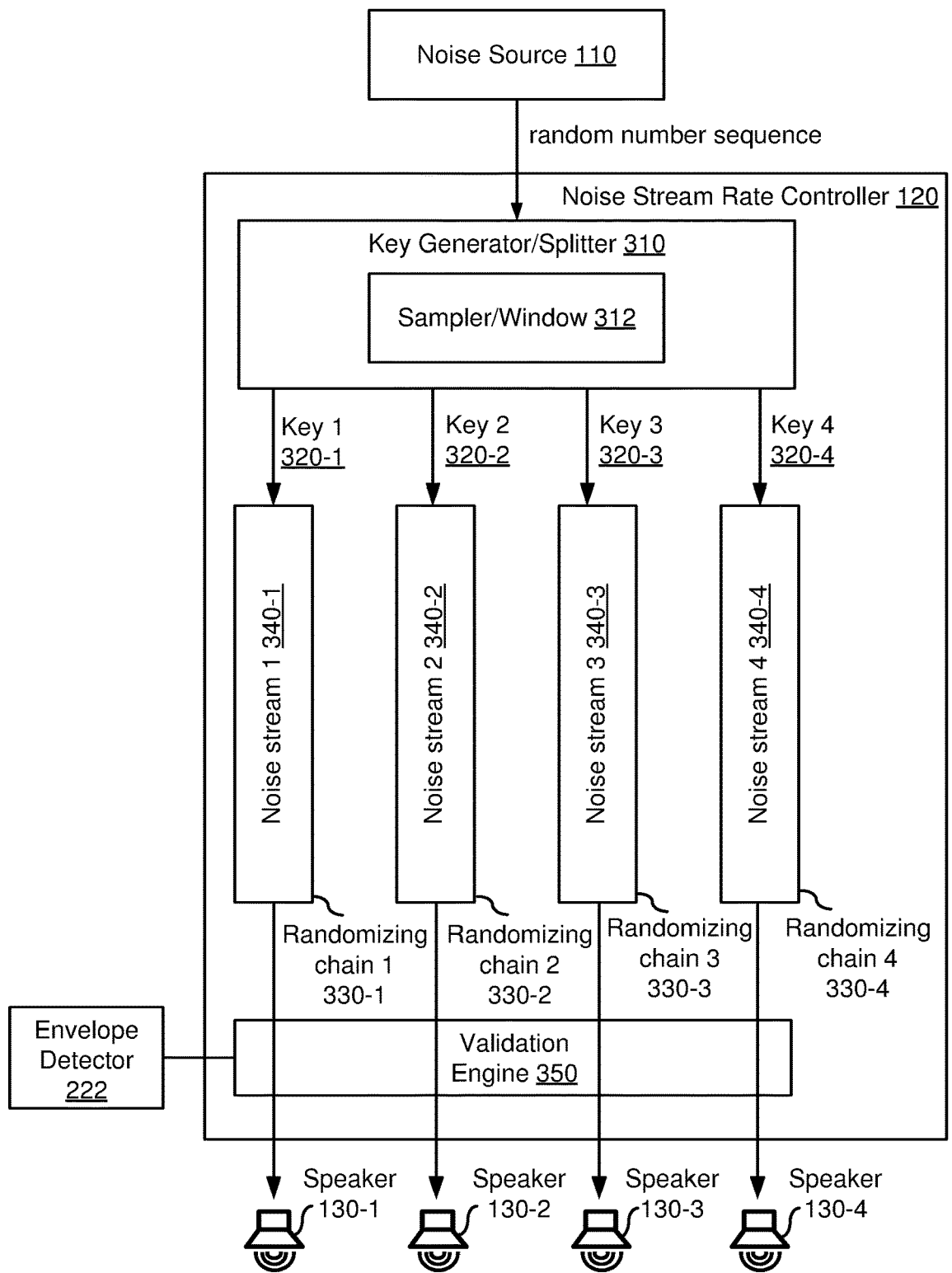
FIG. 3 is an illustration of exemplary noise masking signal generation in accordance with some embodiments.

FIG. 3 is a simplified block diagram illustrating noise masking signal generation by various components of an audio jamming apparatus (e.g., the active case 210), in accordance with some embodiments. As described above with reference to FIG. 1, in some embodiments, the active case 210 includes the noise source 110 that is a random number generator providing a random number sequence. Also as described above with reference to FIG. 1, in some embodiments, the noise stream rate controller 120 is coupled to the noise source 110. In some embodiments, the noise stream rate controller 120 includes a key generator 310 (also known as a key splitter) to generate a plurality of keys 320, a plurality of randomizing chains 330 to provide discrete random number sequence streams 340, and a validation engine 350 to validate the noise masking signal. It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. Also, those of ordinary skill in the art will appreciate from the present disclosure that the functions of the components described below can be combined into one or more components and/or further sub-divided into additional sub-components; and, that the components described below are provided as exemplary configuration of the various aspects and functions described herein.

To that end, as a non-limiting example, in some embodiments, the key generator 310 is coupled to a noise signal generator (e.g., the noise source 110 that generates a random number sequence) and receives the random number sequence from the noise source 110. The key generator 310 then synthesizes the random number sequence in order to generate a plurality of keys 320. In some embodiments, the key generator 310 splits the received random number sequence into a plurality of keys 320 using a sampler or a window 312. The sampling performed by the sampler/window 312 in accordance with various embodiments is described below in detail with reference to FIG. 4A. The windowing performed by the sampler/window 312 in accordance with various embodiments is described below in detail with reference to FIG. 4B.

In some embodiments, the plurality of randomizing chains 330 are coupled to the key generator 310. Each of the randomizing chains 330 receives a corresponding key 320 from the key generator 310, e.g., the randomizing chain 1 330-1 receives key 1 320-1, the randomizing chain 2 330-2 receives key 2 320-2, the randomizing chain 3 330-3 receives key 3 320-3, and the randomizing chain 4 receives key 4 320-4 from the key generator 310.

In some embodiments, based on the corresponding key 320, each of the randomizing chains 330 generates a respective discrete random number sequence (also known as a noise stream) 340 based on the corresponding key. For example, the randomizing chain 1 330-1 uses key 1 320-1 as a random seed to generate the discrete random number sequence outputted as noise stream 1 340-1, the randomizing chain 2 330-2 uses key 320-2 as a random seed to generate the discrete random number sequence outputted as noise stream 2 340-2, the randomizing chain 3 330-3 uses the corresponding key 3 320-3 as a random seed to generate the discrete random number sequence as noise stream 3 340-3, and the randomizing chain 4 330-4 uses the corresponding key 4 320-4 as a random seed to generate the discrete random number sequence as noise stream 4 340-4. As used herein, a random seed is a number (or vector) used for initializing a random or pseudorandom number generator. For instance, as shown in FIG. 1, the PRNG 122 as one randomizing chain can receive a key from the noise source 110 as a random seed and generate a random number sequence. Referring back to FIG. 3, separate randomizing chains 330 receive separate keys 320 for generating the discrete random number sequences 340. As a result, the discrete random number sequences 340 generated by these separate randomizing chains 330 are uncorrelated.

In some embodiments, the uncorrelated noise streams (e.g., the discrete random number sequences 340) are provided to two or more output devices, such as the speakers 130-1, 130-2, 130-3, and 130-4. Each of the speakers 130 connects to a respective randomizing chain 330 and receives a respective discrete random number sequence 340, e.g., the speaker 130-1 is connected to randomizing chain 1 330-1 for receiving noise stream 1 340-1, the speaker 130-2 is connected to randomizing chain 2 330-2 for receiving noise stream 2 340-2, the speaker 130-3 is connected to randomizing chain 3 330-3 for receiving noise stream 3 340-3, and the speaker 130-4 is connected to randomizing chain 4 330-4 for receiving noise stream 4 340-4. Upon receiving the respective discrete random number sequence 340, each of the speakers 130 outputs noise signals based on a function of the respective discrete random number sequence. As described above with reference to FIGS. 1 and 2, each of the speakers 130 is mateable with at least one microphone 142 of the user equipment 140, and the output noise signals are directed to the microphones 142 in order to jam and/or mask the audio signals recorded by the user equipment 140.

Providing distinct uncorrelated masking signals in accordance with embodiments described herein reduces the likelihood of deriving protected audio content captured by multiple microphones 142 on the user equipment 140. For example, in case the speakers 130 output the same masking signals, the same masking signals are mixed with the audio content recorded by the microphones 142 of the user equipment 140. Sophisticated privacy intrusion methods may recover the audio content by comparing the audio signals from one microphone 142-1 (FIG. 2) against the audio signals from another microphone 142-2 (FIG. 2). In contrast, using the audio jamming apparatus 210 disclosed herein, the noise masking signals outputted based on the discrete random number sequence 340-1 and fed to the microphone 142-1 (not shown) are different from the noise masking signals outputted based on the discrete random number sequence 340-2 and fed to the microphone 142-2 (not shown). As a result, the mixed signals recorded by the microphones on the user equipment (not shown) are uncorrelated and distinct. It is more difficult to derive the protected audio content, thus the audio jamming apparatus 210 disclosed herein provides more effective privacy protection.

In some embodiments, the plurality of randomizing chains 330 is coupled to the validation engine 350. In some embodiments, the validation engine 350 is also coupled to the envelope detector 222 and the speakers 130. Through the coupling with the envelope detector 222, the validation engine 350 obtains the level of ambient sound from the envelope detector 222. The validation engine 350 then compares the level of ambient sound with the level or amplitude of the output noise signals in order to determine whether or not the output noise signals from the speakers 130 are at the appropriate level for masking the ambient sound. Based on the comparison result, in some embodiments, through the coupling with the speakers 130, the validation engine 350 directs the speakers 130 to adjust the output noise signals in case the level of the output noise signals is not appropriate (e.g., too high or too low) for masking the ambient sound.

In some embodiments, in addition to adjusting or shaping the amplitude of the noise masking signals through the validation engine 350, the noise stream rate controller 120 also shapes other characteristics of the noise masking signals. For example, the noise stream rate controller 120 can shape the noise masking signals to certain frequency pattern, e.g., shaping the output signals as pink noise to protect human speech and pink noise is less obtrusive for human ears. In some embodiments, for the user equipment 140 (FIG. 2) to receive desired noise frequency characteristics, the noise stream rate controller 120 shapes the noise masking signals, e.g., by applying a digital filter with certain frequency characteristics as directed by the validation engine 350. For instance, along the sealing path, components including the speaker 130 (FIG. 1), the audio seal (134), and the microphone 142 may have a combined frequency characteristic. In order to obtain desired noise frequency characteristics at the user equipment 140 (FIG. 1), the noise stream rate controller 120 can set, adjust, or modify the noise masking signal frequency characteristics as a function of the desired characteristics and the combined frequency characteristic associated with the sealing path in accordance with some embodiments.

The validation engine 350 disclosed herein balances protection and obtrusiveness by causing the apparatus 210 to vary audio jamming based on characteristics of ambient sound. For example, in a quiet room, where the ambient sound level is low, it is obtrusive for the active case 210 to output loud noise masking signals. On the other hand, when the ambient sound is loud, e.g., when people are yelling, it is necessary to increase the noise masking signal level in order to mask the conversation.

Figure 4A:
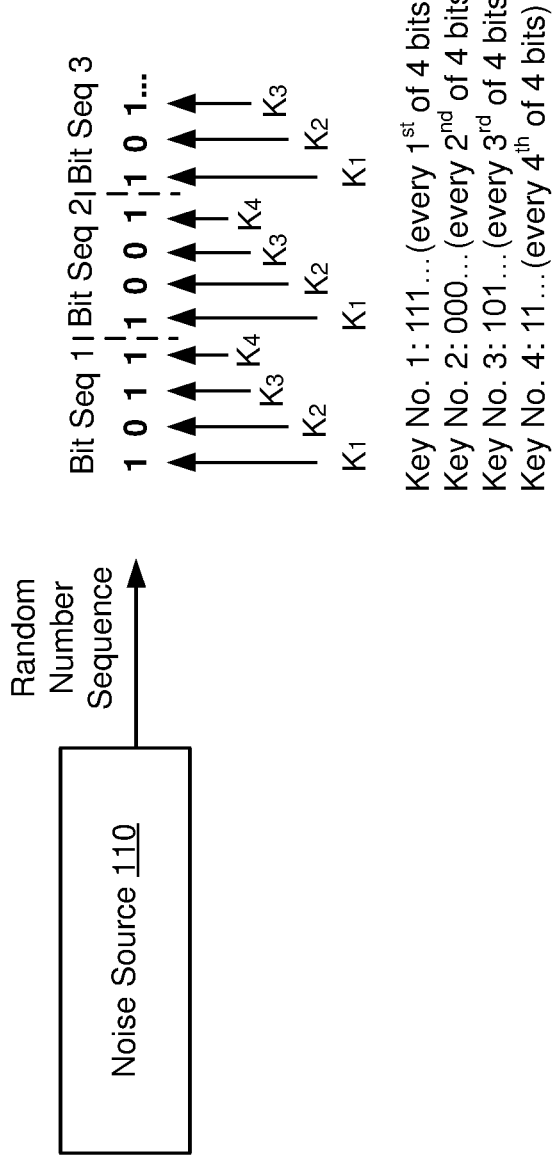
FIGS. 4A-4C are illustrations of key generation for noise stream generation in accordance with some embodiments.

FIG. 4A is a block diagram illustrating one exemplary embodiment of the key generator 310 that generates a plurality of keys using a sampler (e.g., the sampler 312 in FIG. 3). In some embodiments, as described above with reference to FIGS. 1-3, the key generator 310 receives the random number sequence from the noise source 110. Upon receiving the random number sequence, the key generator 310 synthesizes the random number sequence in order to generate the plurality of keys. In some embodiments, the synthesizing includes splitting the random number sequence into bit sequences and extracting from each of the bit sequences a digit for a key of the plurality of keys.

For example, as shown in FIG. 4A, the key generator/splitter 310 splits the random number sequence "10111001101 . . . " into a number of bit sequences, e.g., bit sequence 1, bit sequence 2, bit sequence 3, etc. In some embodiments, each bit sequence is equal in size. For example, in FIG. 4A, both the first bit sequence "1011" and the second bit sequence "1001" are 4 bits long. In some embodiments, the bit sequences are of various sizes. For example, in FIG. 4A, the third bit sequence "101" is 3 bits long, a different length from the first and the second bit sequence. In some embodiments, the bit sequences are adjacent to each other, e.g., bit sequence 1 is adjacent to bit sequence 2, which is further adjacent to bit sequence 3, etc., as shown in FIG. 4A. In some embodiments, the bit sequences are not next to each other, e.g., one bit sequence is separated from a subsequent bit sequence by a number of bits. In other words, the bit sequences can be sequential (as shown in FIG. 4A) or disjunctive (not shown).

In FIG. 4A, in order to generate four keys, the key generator extracts the first bit from each bit sequence. As a result, the first key comprises bits extracted from the first bit of each bit sequence, e.g., key "1111 . . . " is formed by taking the first bit value of "1" from the first bit sequence "1011", followed by taking the first bit value of "1" from the second bit sequence "1001", and followed by taking the first bit value of "1" from the third bit sequence "101". Likewise, the second key "000 . . . " comprises bits extracted from the second bit of each bit sequence; the third key "101 . . . " comprises bits extracted from the third bit of each bit sequence; and the fourth key "11 . . . " comprises bits extracted from the fourth bit of each bit sequence, etc.

Figure 4B:
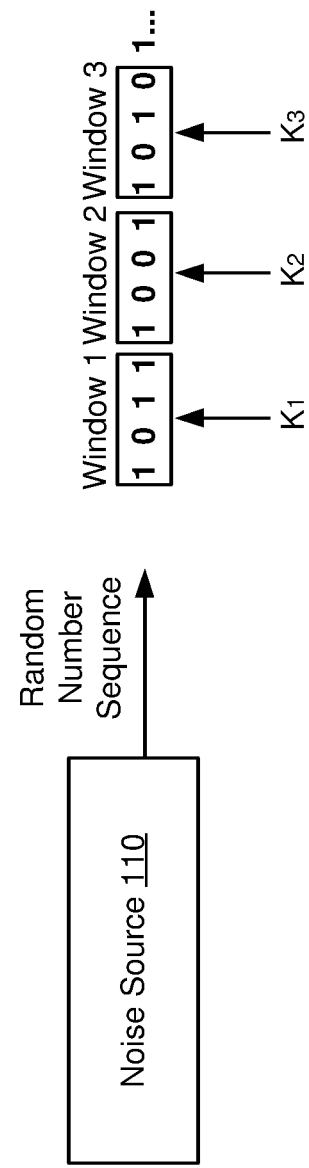

FIG. 4B is a block diagram illustrating one exemplary embodiment of the key generator 310 that generates a plurality of keys (e.g., the plurality of keys 320 in FIG. 3) using a window (e.g., the window 312 in FIG. 3). In some embodiments, as described above with reference to FIGS. 1-3, the key generator 310 receives the random number sequence from the noise source 110. Upon receiving the random number sequence, the key generator 310 synthesizes the random number sequence in order to generate the plurality of keys. In some embodiments, the synthesizing includes applying a plurality of windows to split the random number sequence and extracting from each of the plurality of windows a key of the plurality of keys.

For example, in FIG. 4B, the key generator/splitter 310 applies a plurality of windows to the random number sequence, so that the random number sequence is split into a number of bit sequences, with each bit sequence fits in a respective window. In some embodiment, the size of the window is the same as the desired key length. For example, in order to generate a key that is 4 bits long, as shown in FIG. 4B, the key generator 310 applies a number of windows to the random number sequence with each window containing a 4-bit sequence, e.g., window 1 contains 4-bit sequence "1011", window 2 contains 4-bit sequence "1001", and window 3 contains 4-bit sequence "1010", etc. In some embodiments, the size of the window is different from the desired key length. In such embodiments, the key generator/splitter 310 extracts a key from each window, e.g., by obtaining a sub-portion of the bit sequence within the window or randomly selecting a number of bits from each window.

Figure 4C:
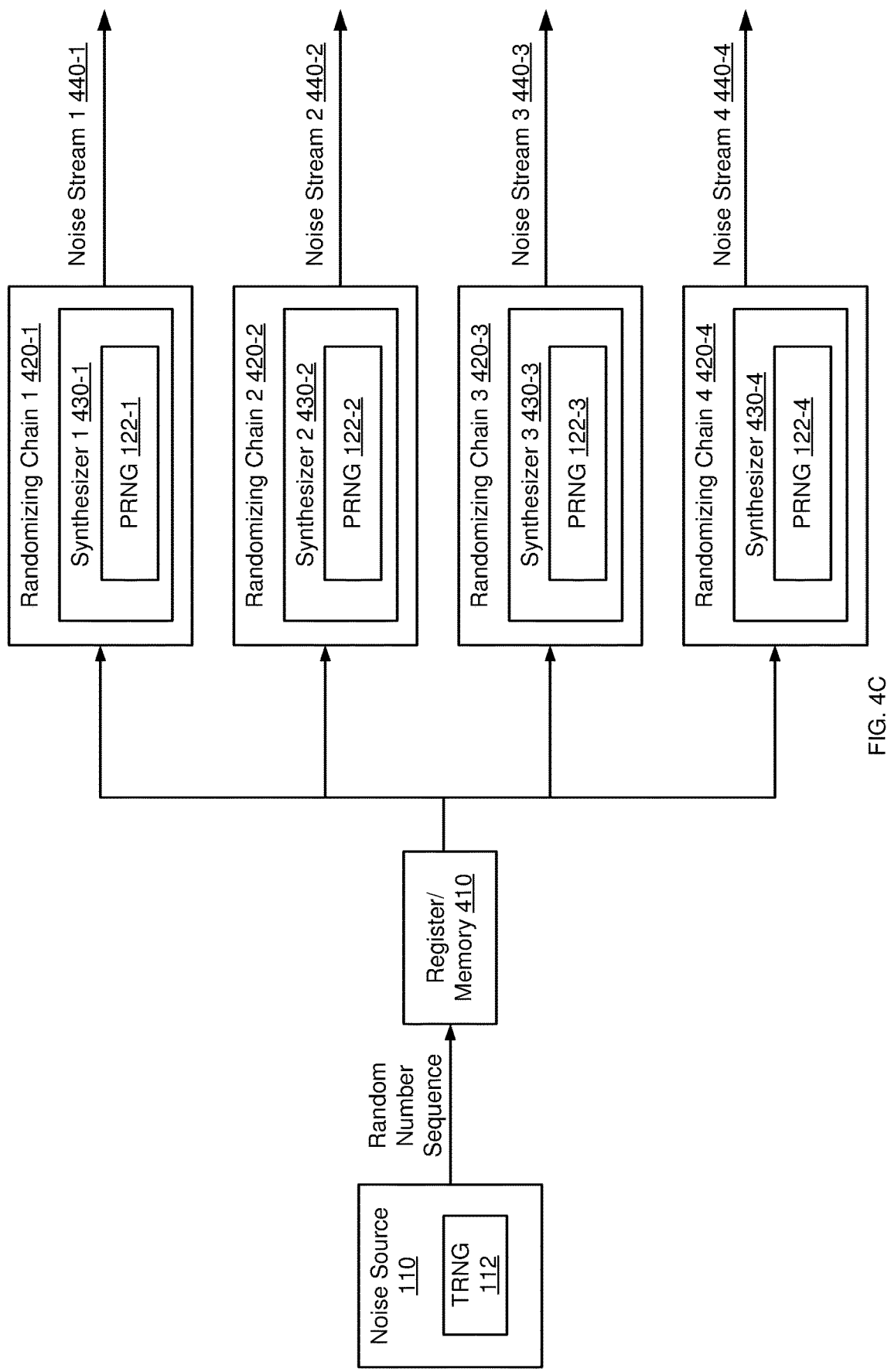

FIG. 4C is a block diagram illustrating one exemplary embodiment of the noise stream generation performed by the noise stream rate controller 120. In some embodiments, as described above with reference to FIGS. 1-3, the noise source 110 (e.g., using a true random number generator) generates random number sequence. The generated random number sequence is stored in a register/memory 410 before being provided as a seed to randomizing chains 420. In some embodiments, each randomizing chain 420 includes a respective synthesizer 430 that uses the seed from the register/memory 410 and generates a noise stream 440. For example, each of the synthesizers 430 can be a respective PRNG 122 that uses linear-feedback shift registers to receive a 16-bit seed from the register/memory 410 with a rate of 64 bits per second. The respective PRNG 122 then outputs a respective noise stream 440 at a rate of 48 kilo-samples per second. Thus, the PRNG 122 controls the sampling rate without sacrificing the randomness of the noise stream 440.

It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. Also, those of ordinary skill in the art will appreciate from the present disclosure that the functions of the components described below can be combined into one or more components and/or further sub-divided into additional sub-components; and, that the components described above are provided as exemplary configuration of the various aspects and functions described herein. For instance, while FIG. 4C does not show a key generator (e.g., the key generator/splitter 310, FIG. 3), the PRNG 122 as the rate controller can be coupled to the key generator. In other words, the rate controller can modify the data rate at various stages of the noise stream 440 generation.

Figure 5:
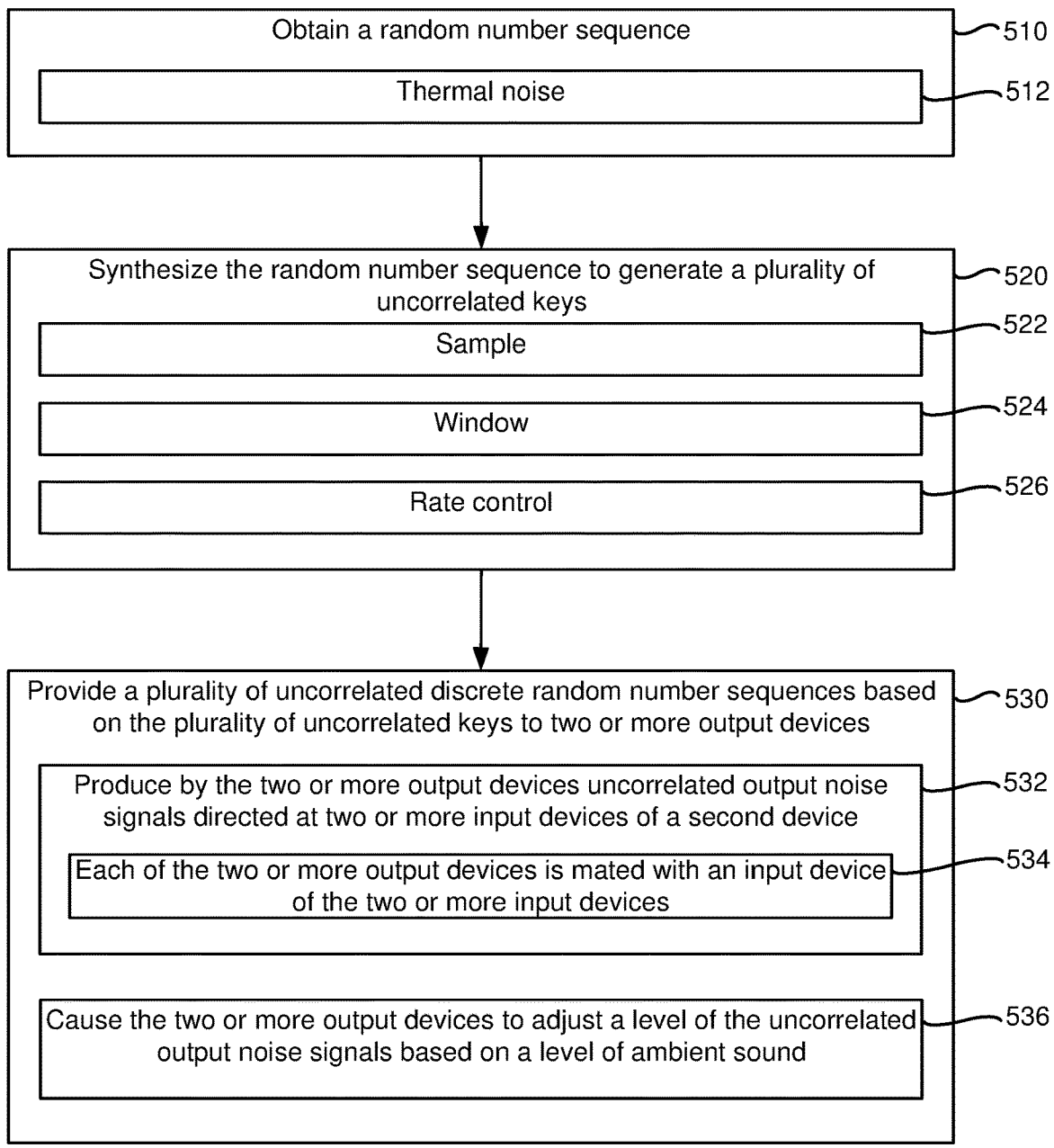
FIG. 5 is a flowchart illustrating a method for providing uncorrelated noise masking in accordance with some embodiments.

FIG. 5 is a flowchart representation of a method 500 for providing uncorrelated noise masking, in accordance with some embodiments. In some embodiments, the method 500 is performed at an apparatus (e.g., the active case 210, FIG. 2) with a processor (e.g., the digital signal processor 220, FIG. 2) and a non-transitory memory storing instructions for execution by the processor. In some embodiments, the method 500 is performed by the noise stream rate controller 120 (FIG. 1). Briefly, the method 500 includes providing uncorrelated noise masking signals to input devices on user equipment. The uncorrelated noise masking signals are produced by using a plurality of uncorrelated keys as random seeds. The plurality of uncorrelated keys is obtained by sampling or windowing a random number sequence from a noise source. In some embodiments, the noise masking signals are further shaped to adapt to the ambient sound level in order to balance protection and obtrusiveness.

To that end, as represented by block 510, the method 500 includes obtaining a random number sequence from a noise source (e.g., the noise source 110, FIG. 1). In some embodiments, as represented by block 512, the random number sequence represents thermal noise provided by a thermally-based random noise generator (e.g., a diode or a resistor).

As represented by block 520, the method 500 includes synthesizing the random number sequence to generate a plurality of uncorrelated keys (e.g., the plurality of keys 320, FIG. 3). In some embodiments, as represented by block 522, the synthesizing is performed by sampling, as described above with reference to FIG. 4A. In some embodiments, as represented by block 524, the synthesizing is performed by windowing, as described above with reference to FIG. 4B. In some embodiments, as represented by block 526, the synthesizing includes sampling rate control, as described above with reference to FIG. 4C.

In some embodiments, as represented by block 530, based on the plurality of uncorrelated keys, the method 500 includes providing a plurality of uncorrelated discrete random number sequences (e.g., the noise streams 340-1, 340-2, 340-3, and 340-4, FIG. 3) to two or more output devices (e.g., the speakers 130, FIGS. 2-3). In some embodiments, the plurality of uncorrelated discrete random number sequences is generated using the plurality of uncorrelated keys as seeds. In some other embodiments, the random number sequence generated by a true or pseudo random number generator can be a long sequence. In such embodiments, instead of using a portion of the random number sequence as a seed to generate more random numbers, the random number sequence is divided up into smaller portions as uncorrelated keys, by sampling, windowing, sampling rate control, or other suitable number sequence division mechanisms, and the smaller portions are used as the plurality of uncorrelated discrete random number sequences.

In some embodiments, as represented by block 532, the method 500 includes producing, by the two or more output devices (e.g., the speakers 130, FIGS. 2-3), uncorrelated output noise signals directed at two or more input devices (e.g., the microphones 142, FIG. 2) of a second device (e.g., the user equipment 140, FIGS. 1-2).

In some embodiments, as represented by block 534, each of the two or more output devices (e.g., the speakers 134, FIGS. 2-3) is mated with an input device of the two or more input devices (e.g., the microphones 142, FIG. 2). For example, with reference to FIG. 2, the speaker 130-1 is mated with the microphone 142-1 through the seal 134-1, the speaker 130-2 is mated with the microphone 142-2 through the seal 134-2, the speaker 130-3 is mated with the microphone 142-3 through the seal 134-3, and the speaker 130-4 is mated with the microphone 142-4 through the seal 134-4.

In some embodiments, as represented by block 536, the method 500 further includes causing the two or more output devices (e.g., the speakers 130, FIGS. 2-3) to adjust a level of the uncorrelated output noise signals based on a level of ambient sound. For example, with reference to FIG. 3, the validation engine 350 obtains the level of ambient sound from the envelope detector 222 and compares the level of ambient sound with the level or amplitude of the output noise signal in order to determine whether or not the output noise signal is at the appropriate level for masking the ambient sound. Based on the comparison result, the validation engine 350 directs the speakers 130 to adjust the output noise signal level in accordance with a determination that the output noise signal level is not appropriate (e.g., too high or too low) for masking ambient sound.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
a random number generator providing a random number sequence;
a key generator coupled to the random number generator to receive the random number sequence and synthesize the random number sequence to generate a plurality of keys; and
a plurality of randomizing chains coupled to the key generator, each receiving a corresponding key from the key generator, and each providing a respective discrete random number sequence based on the corresponding key;
two or more output devices, each of the two or more output devices is connected to a respective randomizing chain to receive the respective discrete random number sequence and produces a respective output noise signal based on a function of the respective discrete random number sequence, wherein each of the two or more output devices is mateable with one or more input devices of a second device; and two or more interfaces mating the two or more output devices with the two or more input devices of the second device.

2. The apparatus of claim 1, wherein the key generator synthesizes the plurality of keys from the random number sequence by splitting the random number sequence into bit sequences, and extracting from each of the bit sequences a digit for a key of the plurality of keys.

3. The apparatus of claim 1, wherein the key generator synthesizes the plurality of keys from the random number sequence by applying a plurality of windows to split the random number sequence, and extracting from each of the plurality of windows a key of the plurality of keys.

4. The apparatus of claim 1 further comprising a sound detector operable to detect a level of ambient sound in which the apparatus is operating.

5. The apparatus of claim 4 further comprising a validation engine, coupled to the sound detector, operable to obtain the level of ambient sound from the sound detector and determine whether or not a level of the respective output noise signal is appropriate for the level of ambient noise.

6. The apparatus of claim 5, wherein the validation engine is coupled to the two or more output devices to direct the two or more output devices to adjust the level of the respective output noise signal based on the determination that the level of the respective output noise signal is not appropriate for the level of ambient sound.

7. The apparatus of claim 1, wherein an interface of the two or more interfaces is an audio seal defining a passageway from a respective output device of the two or more output devices to a respective input device of the one or more input devices in order to direct the respective output noise signal from the respective output device to the respective input device.

8. The apparatus of claim 1, wherein the random number generator is a true random noise generator (TRNG).

9. The apparatus of claim 1, wherein each of the plurality of randomizing chains is a random number generator using the corresponding key as a random seed to generate the respective discrete random number sequence.

10. The apparatus of claim 1, further comprising a noise stream rate controller operable to modify a rate of data provided to the two or more output devices for the respective output noise signal production.

11. The apparatus of claim 10, wherein the noise stream rate controller is coupled to the plurality of randomizing chains and the two or more output devices, operable to modify a rate of the respective discrete random number sequence production from a first rate to a second rate, different from the first rate.

12. The apparatus of claim 10, wherein the noise stream rate controller is coupled to the key generator, operable to modify a rate of the plurality of keys generation from a first rate to a second rate, different from the first rate.

13. A method comprising:

obtaining a random number sequence;

synthesizing the random number sequence to generate a plurality of uncorrelated keys; and providing a plurality of uncorrelated discrete random number sequences based on the plurality of uncorrelated keys to two or more output devices wherein the two or more output devices produce uncorrelated output noise signals directed at two or more input devices of a second device based on a function of a respective discrete random number sequence, wherein each of the two or more output devices is mateable with one or more input devices of the second device.

14. The method of claim 13, wherein synthesizing the random number sequence includes splitting the random number sequence into bit sequences, and extracting from each of the bit sequences a digit for a key of the plurality of uncorrelated keys.

15. The method of claim 13, wherein synthesizing the random number sequence includes applying a plurality of windows to split the random number sequence, and extracting from each of the plurality of windows a key of the plurality of uncorrelated keys.

16. The method of claim 13 further comprising causing the two or more output devices to adjust a level of the uncorrelated output noise signals based on a level of ambient sound.

17. The method of claim 13, wherein each of two or more interfaces mating the two or more output devices with the two or more input devices of the second device is an audio seal defining a passageway from a respective output device of the two or more output devices to a respective input device of the one or more input devices in order to direct the respective output noise signal from the respective output device to the respective input device.

18. The method of claim 13, wherein a discrete random number sequence of the plurality of uncorrelated discrete random number sequences is generated using a corresponding key of the plurality of uncorrelated keys as a random seed.

19. The method of claim 13 further comprising modifying a rate of the respective discrete random number sequence from a first rate to a second rate, different from the first rate.

20. The method of claim 13 further comprising modifying frequency characteristics of the respective discrete random number sequence as a function of desired frequency characteristics received at the second device.

* * * * *